United States Patent [19]
Bernardi et al.

[11] Patent Number: 5,684,471
[45] Date of Patent: Nov. 4, 1997

[54] IR REMOTE CONTROL TRANSMITTER WITH POWER SAVING FEATURE

[75] Inventors: Mark Bernardi, Highland Park; Carl W. Stacy, Elmwood Park, both of Ill.

[73] Assignee: Zenith Electronics Corporation, Glenview, Ill.

[21] Appl. No.: 506,407

[22] Filed: Jul. 24, 1995

[51] Int. Cl.⁶ .................. H04B 10/04; G08C 23/04
[52] U.S. Cl. .......... 340/825.72; 341/176; 341/22; 341/26; 359/146; 455/151.1; 455/151.2; 348/734
[58] Field of Search .......... 340/825.72, 825.57, 340/825.69, 825.25; 341/176, 22, 26, 24; 359/146, 147, 148; 455/151.1, 151.2; 348/734

[56] References Cited

U.S. PATENT DOCUMENTS

| | | | |
|---|---|---|---|
| 4,774,511 | 9/1988 | Rumbolt et al. | 340/825.69 |
| 4,825,200 | 4/1989 | Evans et al. | 340/825.72 X |
| 4,856,081 | 8/1989 | Smith | 340/825.69 X |
| 5,153,580 | 10/1992 | Pollack | 340/825.69 X |
| 5,512,893 | 4/1996 | Gulick | 341/26 |

FOREIGN PATENT DOCUMENTS 61-145996  7/1986  Japan ................. 340/825.69

*Primary Examiner*—Michael Horabik
*Assistant Examiner*—William H. Wilson, Jr.

[57] ABSTRACT

A remote control transmitter has a kill mode in which less power is drawn than in the full power operating mode. The transmitter has a stop mode in which minimal power is consumed. The stop mode is entered whenever no keys are being depressed. The device stays in the kill mode whenever a key closure is maintained for longer than a predetermined time.

10 Claims, 2 Drawing Sheets

1

IR REMOTE CONTROL TRANSMITTER WITH POWER SAVING FEATURE

BACKGROUND OF THE INVENTION AND PRIOR ART

This invention relates generally to infrared (IR) remote control transmitters and particularly to a novel power saving circuit for use with infrared remote control transmitters that are subject to inadvertent long duration key closures.

Remote control transmitters are generally hand-held devices that rely upon a battery for power. Consequently, optimizing power consumption is a prime consideration. In most control devices a standby or stop mode is entered when the transmitter becomes inactive, i.e. no key is being pressed. In the stop mode, a recovery line for the microprocessor is maintained active for recognizing when a key closure does occur. Upon a key closure being sensed, the microprocessor "wakes up" and commences the normal keyboard scanning process in which the key closure is located and the appropriate coded IR command signal corresponding thereto is transmitted. Because the device oscillator is non functional in the stop mode, the current drain on the battery is minimal.

Excessive battery drain may occur in remote control transmitters where inadvertent long duration key closures are maintained. In some brands of remote control transmitters, continuous commands are sent as long as a key is depressed. In other brands, the command is terminated despite continued depression of a key. Since most new remote control transmitters are multi brand, i.e. capable of mimicking control signals of different manufacture, both types of signals need to be considered. For commands such as direct channel entry, on/off, and the like, the television receiver may be arranged to simply ignore an overly long command. However, inadvertently maintaining a key closure on the remote control transmitter still results in a continuous transmission of the IR coded signal with the relatively high current drain on the battery that occurs during the normal operating mode. Generally speaking, overly long key closures are not a significant problem in ordinary usage. However, the small size of the remote control transmitter and the environment of its use makes it prone to becoming lodged between the cushions of a couch or the like. This often occurs and, in many instances, the device is lodged in a position that results in a continuous key closure. A transmitter in that condition draws full power from the battery and results in very short battery life. Invariably when the lost transmitter is retrieved (and the key is released), the battery has been fully discharged and the device is inoperative.

The present invention provides a solution to this problem by operating the remote control device in a substantially reduced power kill mode in the event a key closure is maintained for a predetermined duration.

OBJECTS OF THE INVENTION

A principal object of the invention is to provide a novel remote control device.

Another object of the invention is to provide a remote control device that has enhanced power saving features.

A further object of the invention is to provide a remote control device with a power saving mode for an overly long key closure.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
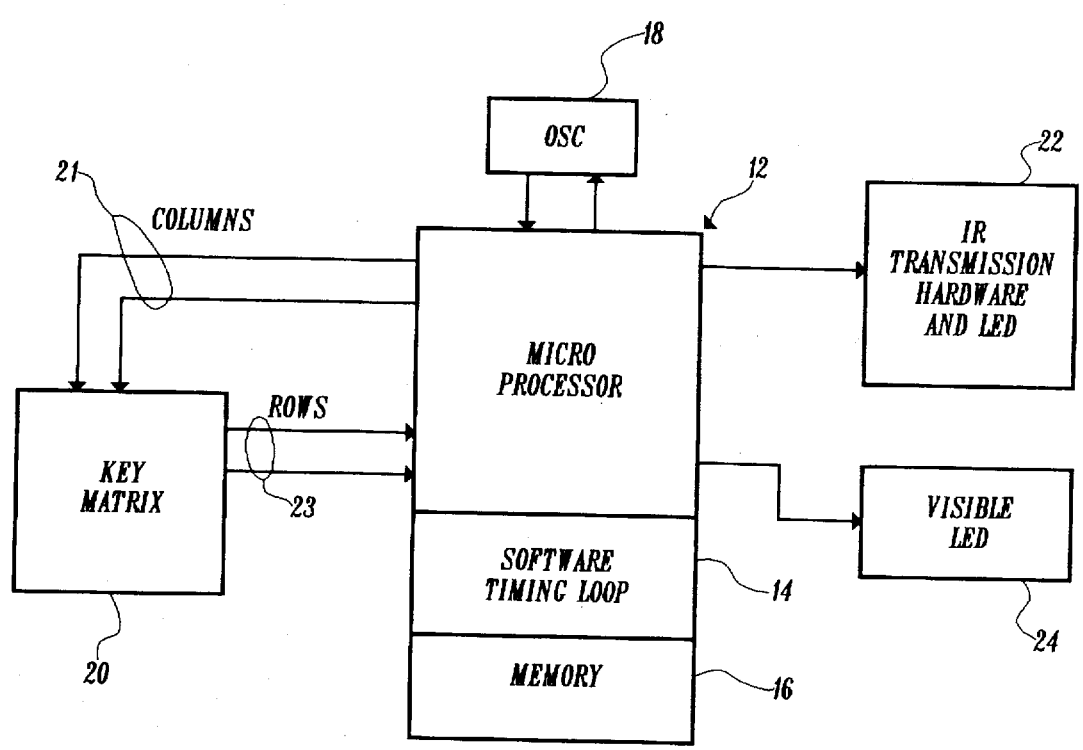
FIG. 1 represents a simplified schematic diagram of a transmitter constructed in accordance with the invention.

In FIG. 1, a remote control transmitter 10 is generally shown in block diagram form. A microprocessor 12, including a software timing loop 14 and a memory 16, is coupled to an oscillator 18. Microprocessor 12 controls the scanning of a key matrix 20 via a pair of lines 21 labelled columns and a pair of lines 23 labelled rows. The keyboard scanning operation, which is conventional and serves to identify a key closure in the key matrix, is implemented by generating a plurality of column timing signals on column lines 21 in response to software loop 14 and monitoring the resulting signal on row lines 23. As is well known, the particular key closure is associated with a selected control function and an appropriate control command signal stored in memory 16 is applied by microprocessor 12 to an IR transmission hardware circuit, including an IR LED 22 for transmitting an appropriate IR coded command signal to a receiving device (not shown). Also a visible LED 24 is energized to provide the user with an indication that the remote control transmitter device is functioning in response to the key closure. Those skilled in the art will be familiar with the operations of microprocessor 12 and the software control circuits used for recognizing a key closure, initiating a keyboard scanning routine for determining which key has been depressed and generating the appropriate IR command signal corresponding to that key closure.

Most IR remote control transmitters have a stop mode that corresponds to a standby condition in which minimum current is drawn from the battery power supply. In the stop mode, oscillator 18 does not run which makes for very low power consumption. While in the stop mode, each column of key matrix 20 is set to a predetermined level (e.g. 0 volts) and every row, each of which is connected by a pull-up resistor to a high voltage level, is looked at for a change to the predetermined 0 voltage level. When a low level is detected on any row in response to a key closure, the microprocessor "wakes up" and turns on oscillator 18 for initiating the normal keyboard scanning process. In accordance with the invention, when a key closure is maintained continuously for 60 seconds or more, the device enters a kill mode in which substantially less power is consumed by the transmitter in order to conserve battery life. It will be appreciated by those skilled in the art that the kill mode may simply be the stop mode in a given design. For the current implementation using a standard Zenith remote control transmitter, putting the microprocessor into its stop mode would require disabling of a stop mode recovery line for the row in which the key closure occurred. Doing so would temporarily disable a number of the keys on the keyboard. If the lost transmitter was recovered by the user and the user attempted to operate the device using one of the keys in the disabled row, the user might conclude that the transmitter was non functional. In the presently preferred implementation of the invention, the transmitter remains in a kill mode in which oscillator 18 continues to run and microprocessor 12 continues key scanning but there is no IR transmission nor visible LED operation. This results in a current drain of approximately 3 milliamperes which is significantly less than the current requirement for normal IR transmission although greater than the minimal current used when the microprocessor is in the stop mode.

Figure 2:
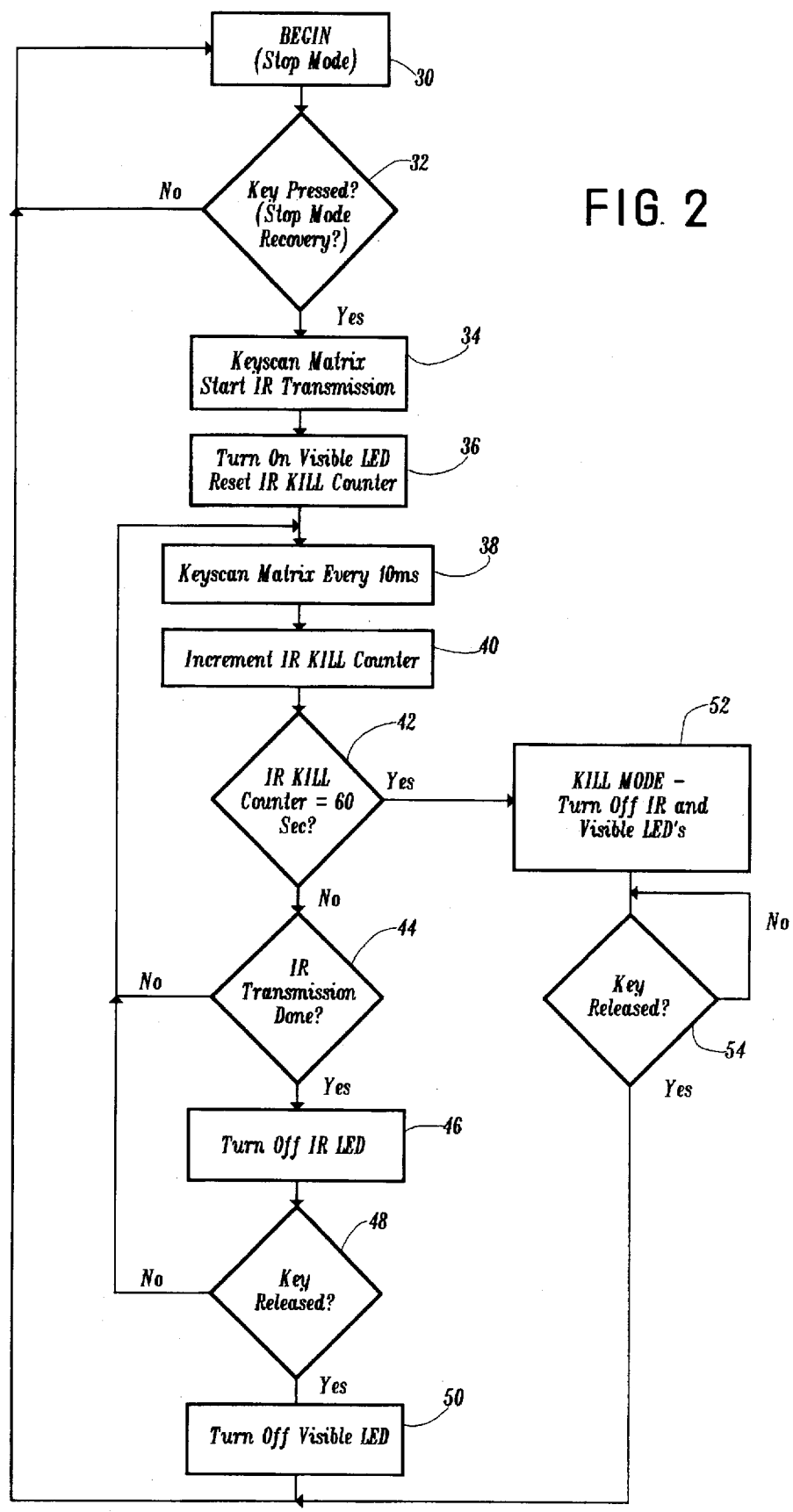
FIG. 2 is a flow chart indicating operation of the transmitter of FIG. 1.

The flow chart in FIG. 2 represents a software routine stored in memory 16 for operating microprocessor 12 in accordance with the invention. Microprocessor 12 is initially assumed to be in the stop mode (step 30) and remains in this mode until a key depression is detected (step 32). A key scan routine is then initiated to identify the depressed key and the transmission of an appropriate IR command is initiated via IR LED 22 (step 34). Visible LED 24 is also turned on at this time to provide a visual indication of the key closure and a software kill counter is reset (step 36). The foregoing steps correspond to the normal operating mode of the transmitter during which full power is drawn. At this point, key scanning of the matrix occurs every 10 milliseconds (step 38) under the control of software loop 14, after which time the IR kill counter is incremented (step 40). Next, the count stored in the kill counter is compared to a maximum predetermined value such as 60 seconds (step 42). Under normal operating conditions, the stored count will be less than 60 seconds. If at this point the IR transmission has been completed (step 44), the IR LED is turned off (step 46) and if a key release is detected (step 48) the visible LED is also turned off (50) and the routine returns to the stop mode. If either the IR transmission persists (step 44) or a key release is not detected (step 48), the routine returns to step 38 wherein key matrix scanning continues and the kill counter is incremented again. If the routine is continuously returned to step 38 from either step 44 or step 48 for a time period of 60 seconds, the program will branch from step 42 to a kill mode (step 52) in which the transmitter will be placed in a reduced power consumption mode by turning off both the IR and visible LED's 22 and 24. The transmitter will remain in the kill mode until a key release is detected (step 54), after which it will return to the stop mode.

In the foregoing manner, the invention effectively protects against excessive battery consumption due to inadvertent key closures that extend beyond one minute. In particular, a reduced battery power consumption kill mode (step 52) is entered if either continuous IR transmission persists for at least 60 seconds (loop 38–44) or a key is depressed for at least 60 seconds (loop 38–48). The former condition may result from the inadvertent long duration closure of a key resulting in a continuously transmitted type IR command while the latter condition may result from the inadvertent long duration closure of a key resulting in a timed short duration IR command transmission.

What has been described is a novel remote control transmitter that includes a power conserving feature in the event a key closure is maintained for longer than a predetermined time. It is recognized that numerous changes in the described embodiment of the invention will be apparent to those skilled in the art without departing from its true spirit and scope. The invention is to be limited only as defined in the claims.

What is claimed is:

1. A method of operating a remote control device comprising:

generating IR commands in response to key closures;

timing all key closures; and disabling the remote control device for the duration of a key closure that is maintained for more than a predetermined time period.

2. The method of claim 1 wherein the IR commands are generated in a full power operating mode and the disabling results in a reduced power mode.

3. The method of claim 2 further including a stop mode requiring minimal power and a kill mode corresponding to the reduced power mode, the kill mode requiring less than full power but more than the minimal power.

4. The method of claim 3 wherein during IR command generation, the device cycles between the stop mode and the operating mode, and wherein release of the key closure in the kill mode returns the device to the stop mode.

5. A method of operating an IR remote control transmitter having an operating mode requiring full power, a kill mode requiring less than full power and a stop mode requiring minimal power, comprising:

entering the operating mode from the stop mode, responsive to a key closure for transmitting selected IR commands;

entering the kill mode upon failure to release the key after a predetermined time; and returning to the stop mode upon release of the key.

6. The method of claim 5 wherein hardware timers are provided for transmitting the selected IR commands, and wherein a software timing loop determines the predetermined time.

7. An IR remote control device comprising:

keyboard means including a keypad for selecting control functions;

IR code generation means for transmitting coded commands for performing said control functions;

keyboard scanning means for determining a key closure on said keypad;

a microprocessor for controlling said keyboard scanning means and said IR code generation means; and means for disabling said remote control device when a key is depressed for longer than a predetermined duration.

8. The device of claim 7 wherein said device has an operating mode requiring full power for said keyboard scanning and for transmitting said coded commands, a stop mode requiring minimal power for standby and a kill mode requiring less than said full power but more than said minimal power, said kill mode being activated by said disabling means.

9. The device of claim 8 further including software timing means for measuring said predetermined duration.

10. The device of claim 9 wherein said predetermined duration is 60 seconds.

* * * * *